United States Patent
Sodhi et al.

(10) Patent No.: US 8,719,515 B2
(45) Date of Patent: May 6, 2014

(54) COMPOSITION OF LOCKS IN SOFTWARE TRANSACTIONAL MEMORY

(75) Inventors: Sukhdeep S. Sodhi, San Jose, CA (US);
Yosseff Levanoni, Redmond, WA (US);
David L. Detlefs, Issaquah, WA (US);
Lingli Zhang, Sammamish, WA (US);
Weirong Zhu, Kirkland, WA (US);
Dana Groff, Sammamish, WA (US);
Michael M. Magruder, Carnation, WA (US); Charles David Callahan, II, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 12/819,499

(22) Filed: Jun. 21, 2010

(65) Prior Publication Data
US 2011/0314244 A1  Dec. 22, 2011

(51) Int. Cl.
*G06F 13/00* (2006.01)
(52) U.S. Cl.
USPC ............. 711/150; 711/E12.093; 710/58
(58) Field of Classification Search
USPC ................... 711/150, E12.093; 710/58
See application file for complete search history.

(56) References Cited

U.S. PATENT DOCUMENTS

| | | | |
|---|---|---|---|
| 5,237,673 A | 8/1993 | Orbits et al. | |
| 6,240,413 B1 | 5/2001 | Learmont | |
| 7,120,762 B2 | 10/2006 | Rajwar et al. | |
| 7,289,992 B2 | 10/2007 | Walker | |
| 7,434,010 B2 | 10/2008 | Duffy et al. | |
| 7,478,210 B2 | 1/2009 | Saha et al. | |
| 8,060,482 B2 | 11/2011 | Wang et al. | |
| 2005/0086446 A1 | 4/2005 | McKenney et al. | |
| 2006/0085591 A1 | 4/2006 | Kumar et al. | |
| 2007/0130238 A1 | 6/2007 | Harris et al. | |
| 2007/0198521 A1 | 8/2007 | McKenney | |
| 2009/0006404 A1 | 1/2009 | Magruder et al. | |
| 2009/0037417 A1* | 2/2009 | Shankar et al. | 707/8 |
| 2009/0077082 A1 | 3/2009 | Magruder et al. | |
| 2009/0125519 A1 | 5/2009 | Robison et al. | |
| 2009/0165006 A1 | 6/2009 | Ceze et al. | |
| 2009/0187599 A1* | 7/2009 | Bruso et al. | 707/200 |
| 2009/0235254 A1 | 9/2009 | Michael | |
| 2010/0332538 A1* | 12/2010 | Gray et al. | 707/774 |

(Continued)

OTHER PUBLICATIONS

".NET Framework 4 Beta 1 Enabled to Use Software Transactional Memory (STM.NET Version 1.0)", Retrieved at <<http://download.microsoft.com/download/9/5/6/9560741A-EEFC-4C02-822C-BB0AFE860E31/STM_User_Guide.pdf>>, Jul. 24, 2009, pp. 1-84.

(Continued)

*Primary Examiner* — Edward Dudek, Jr.
(74) *Attorney, Agent, or Firm* — Kevin Sullivan; Raghu Chinagudabha; Micky Minhas

(57) ABSTRACT

A software transactional memory (STM) system allows the composition of traditional lock based synchronization with transactions in STM code. The STM system acquires each traditional lock the first time that a corresponding traditional lock acquire is encountered inside a transaction and defers all traditional lock releases until a top level transaction in a transaction nest commits or aborts. The STM system maintains state information associated with traditional lock operations in transactions and uses the state information to eliminate deferred traditional lock operations that are redundant. The STM system integrates with systems that implement garbage collection.

20 Claims, 7 Drawing Sheets

(56) References Cited

U.S. PATENT DOCUMENTS

| | | | | |
|---|---|---|---|---|
| 2011/0246725 | A1* | 10/2011 | Moir et al. | 711/147 |
| 2011/0314230 | A1 | 12/2011 | Zhang et al. | |
| 2012/0158684 | A1* | 6/2012 | Lowenstein et al. | 707/704 |
| 2012/0173499 | A1* | 7/2012 | Walker | 707/704 |
| 2013/0297967 | A1* | 11/2013 | Heller, Jr. | 714/10 |

OTHER PUBLICATIONS

Yen, et al., "LogTM-SE: Decoupling Hardware Transactional Memory from Caches", Retrieved at << 007 http://www.cs.wisc.edu/multifacet/papers/hpca07_logtmse.pdf>>, Proceedings of the 2007 IEEE 13th International Symposium on High Performance Computer Architecture, 2007, Feb. 10-14, 2007, pp. 12.

Gottschlich, et al., "An Efficient Lock-Aware Transactional Memory Implementation", Retrieved at << http://ce.colorado.edu/Publications/icooolps09-latm.pdf >>, Proceedings of the 4th workshop on the Implementation, Compilation, Optimization of Object-Oriented Languages and Programming Systems, 2009, Jul. 6-6, 2009, pp. 8.

McDonald, et al., "Transactional Memory: The Hardware-Software Interface", Retrieved at << http://csl.stanford.edu/~christos/publications/2007.hwswtm.ieeemicro.pdf>>, IEEE Micro, vol. 27, Issue 1, Jan. 2007, pp. 67-76.

Bratin Saha et al., McRt -STM: A High Performance Software Transactional Memory System for a Multi-core Runtime, Mar. 2006, ACM, pp. 187-197.

Bai, et al., "A Key-based Adaptive Transactional Memory Executor", Retrieved at <<http://www.cs.wm.edu/~xshen/Publicationsinsfngs07.pdf>>, 21th International Parallel and Distributed Processing Symposium (IPDPS 2007), Mar. 26-30, 2007, pp. 1-8.

Dice, et al., "Understanding Tradeoffs in Software Transactional Memory", Retrieved at <<http://www.cs.tau.ac.il/-shanir/nir-pubs-web/Papers/Understanding.pdf>>,Proceedings of the International Symposium on Code Generation and Optimization 2007, Mar. 11-14, 2007, pp. 13.

The Office Action for U.S. Appl. No. 12/819,494 mailed Oct. 12, 2012 (15 pages).

The Final Office Action for U.S. Appl. No. 12/819,494 mailed Jun. 13, 2013 (18 pages).

* cited by examiner

COMPOSITION OF LOCKS IN SOFTWARE TRANSACTIONAL MEMORY

CROSS REFERENCE TO RELATED APPLICATION

This application is related to co-owned and co-pending U.S. patent application Ser. No. 12/819,494, which is entitled "ACTION FRAMEWORK IN SOFTWARE TRANSACTIONAL MEMORY", filed May 10, 2010, and is incorporated by reference in its entirety.

BACKGROUND

Computer programs may be written to allow different portions of the program to be executed concurrently using threads or another suitable concurrent execution mechanism. In order to execute different portions of the program concurrently, the computer system or the program typically includes some mechanism to manage the memory accesses of the different portions to ensure that the parts access common memory locations in the desired order.

Transactional memory systems allow programmers to designate transactions in a program that may be executed as if the transactions are executing in isolation (i.e., independently of other transactions and other non-transactional sequences of instructions in the program). Transactional memory systems manage the memory accesses of transactions by executing the transactions in such a way that the effects of the transaction may be rolled back or undone if two or more transactions attempt to access the same memory location in a conflicting manner. Transactional memory systems may be implemented using hardware and/or software components.

Transactional memory systems, such as software transactional memory (STM) systems, often have limitations on the types of programming scenarios that are supported. For example, STM systems do not typically support the interoperation between transactional and traditional locks or the use of lock elision for traditional locks inside transactions. To do so, an STM system would be obligated to allow the use of traditional locks inside transactions without precluding the possibility of the same lock protecting shared state inside and outside transactions.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A software transactional memory (STM) system allows the composition of traditional lock based synchronization with transactions in STM code. The STM system acquires each traditional lock the first time that a corresponding traditional lock acquire is encountered inside a transaction and defers all traditional lock releases until a top level transaction in a transaction nest commits or aborts. The STM system maintains state information associated with traditional lock operations in transactions and uses the state information to eliminate deferred traditional lock operations that are redundant. The STM system integrates with systems that implement garbage collection.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
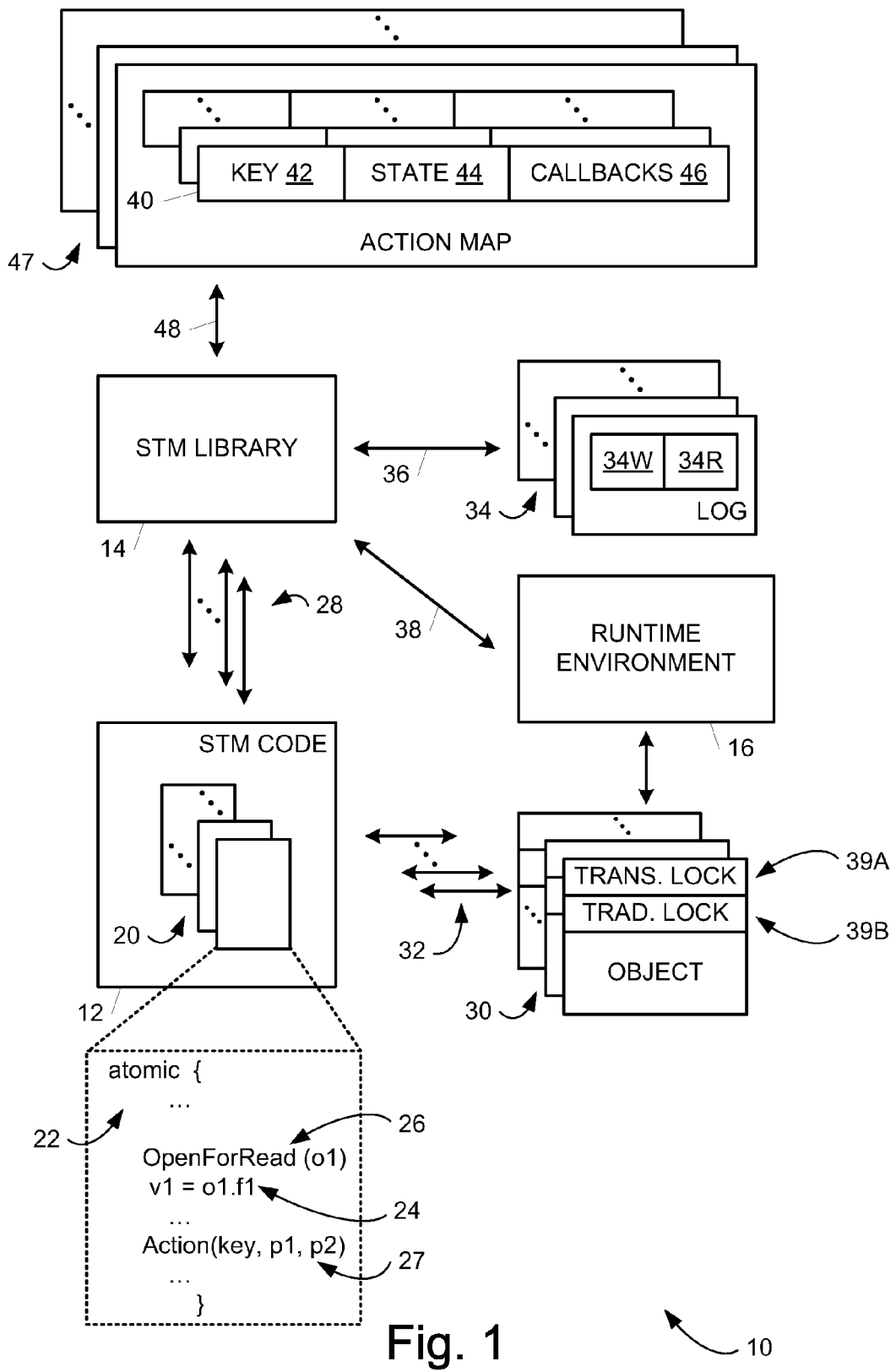
FIG. 1 is a block diagram illustrating an embodiment of a software transactional memory system.

FIG. 1 is a block diagram illustrating an embodiment of a software transactional memory (STM) system 10. STM system 10 represents a runtime mode of operation in a computer system, such as computer system 100 shown in FIG. 7 and described in additional detail below, where the computer system is executing the instructions of STM code 12. STM system 10 allows the composition of traditional lock based synchronization with STM transactions 20 as described in additional detail below.

STM system 10 includes an STM library 14 and a runtime environment 16 for executing STM code 12. STM system 10 is configured to manage the execution of STM transactions 20 that form atomic blocks in STM code 12 to allow transactions 20 to be executed atomically and, if desired, rollback or undo changes made by transactions 20. To do so, STM system 10 tracks memory accesses by transactions 20 to objects 30 using a log 34 for each executing transaction 20 as indicated by an arrow 36.

STM code 12 includes a set of one or more transactions 20 and any suitable non-transactional code. Each transaction 20 includes a sequence of instructions that is designed to execute atomically, i.e., as if the sequence is executing in isolation from other transactional and non-transactional code in STM code 12. Each transaction 20 includes an atomic block designator 22 that indicates that a corresponding portion of STM code 12 is a transaction 20. Transactions 20 also include invocations 26 of STM primitives, which may be added by a compiler such as a compiler 92 shown in FIGS. 6 and 7 and described in additional detail below, that call functions in STM library 14. The STM primitives of STM library 14 return results to transactions 20 as indicated by function calls and returns 28. In addition, each transaction 20 includes zero or more memory accesses 24 that read from and/or write to one or more objects 30 as indicated by arrows 32.

STM code 12 may include one or more nested transactions in the set of transactions 20. A nested transaction is a transaction 20 that is invoked by another transaction 20, i.e., a parent transaction. The parent transaction and any transactions 20 that are invoked by the parent transaction or stem from an invocation from the parent transaction form a transaction nest.

STM library 14 includes STM primitives and instructions executable by the computer system in conjunction with runtime environment 16 to implement STM system 10. The STM primitives of STM library 14 that are callable by transactions 20 may include management primitives that implement start, commit, abort, and retry functions in STM library 14. A transaction 20 calls the start function to initiate the management of the transaction 20 by STM library 14. A transaction 20 calls the commit function to finalize the results of the transaction 20 in memory system 204, if successful. A transaction 20 calls the abort function to roll back or undo the results of the transaction 20 in memory system 204. A transaction 20 calls the retry function to retry the transaction 20. In other embodiments, some or all of the functions performed by STM library 14 may be included in runtime environment 16 or added to transactions 20 by a compiler such as compiler 92 shown in FIGS. 6 and 7.

The STM primitives of STM library 14 that are callable by transactions 20 also include memory access primitives that manage accesses to objects 30 that are written and/or read by a transaction 20. The memory access primitives access a set of one or more transactional locks 39A for each object 30. In one embodiment, STM system 10 uses the object header of objects 30 to store the corresponding transactional locks 39A. Each transactional lock 39A indicates whether a corresponding object 30 or portion of a corresponding object 30 is locked or unlocked for writing and/or reading by a transaction 20. When an object 30 is locked for writing, the corresponding transactional lock 39A includes an address or other reference that locates an entry for the object 30 in a write log 34W in one embodiment. When an object 30 is not locked for writing, the corresponding transactional lock 39A includes a version number of the object 30.

For each non-array object 30, the memory access primitives may access a single transactional lock 39A that locks or unlocks the non-array object 30 for writing and/or reading by a transaction 20. For each array object 30, the memory access primitives may access a set of one or more transactional locks 39A where each transactional lock 39A in the set locks or unlocks a corresponding portion of the array object 30 for writing and/or reading. Runtime environment 16 creates and manages the transactional lock(s) 39A for each object 30.

The memory access primitives of STM library 14 generate and manage a set of one or more STM logs 34 for each transaction currently being executed. Each set of STM logs 34 includes a write log 34W and a read log 34R in one embodiment. Each write log 34W includes an entry for each object 30 that is written by a transaction 20 where each entry includes an address of a corresponding object 30, the version number from the transactional lock 39A of the corresponding object 30, and an address or other reference that locates a shadow copy of the corresponding object 30. Each read log 34R includes an entry for each object 30 that is read by a transaction 20 where each entry includes a reference that locates the transactional lock 39A of a corresponding object 30.

Runtime environment 16 may be any suitable combination of runtime libraries, a virtual machine (VM), operating system (OS) functions, such as functions provided by an OS 122 shown in FIG. 7 and described in additional detail below, and/or compiler functions, such as functions provided by compiler 92 shown in FIGS. 6 and 7 and described in additional detail below.

STM library 14 performs the following algorithm, or variations thereof, to execute each transaction 20. Each time a transaction 20 is started by a thread of execution, STM library 14 creates and initializes variables used to manage the transaction. STM library 14 then allows the transaction 20 to execute and perform any write and/or read memory accesses to objects 30 as follows.

To access an object 30 for writing, the transaction 20 invokes a memory access primitive that opens the object 30 for writing. STM library 14 acquires a transactional lock 39A corresponding to the object 30 for the transaction 20 if the lock 39A is available. If the object 30 is not available (i.e., the object 30 is locked by another transaction 20), then STM library 14 detects a memory access conflict between the current transaction 20 and the other transaction 20 and may initiate an abort phase of transaction execution to rollback and re-execute the current transaction 20. If the object 30 is locked by the current transaction 20, then STM library 14 has already acquired the transactional lock 39A corresponding to the object 30 for the transaction 20. Once a corresponding transactional lock 39A is acquired, STM library 14 causes each write access 32 to be made to either the object 30 itself or a shadow copy of a corresponding object 30 (not shown) and causes an entry corresponding to the write access 32 to be stored in log 34W. For non-array objects 30, the shadow copy, if used, may be stored in log 34W. For array objects 30, a shared shadow copy, if used, may be stored separately from log 34W.

To access an object 30 for reading, the transaction 20 invokes a memory access primitive that opens the object 30 for reading. If the object 30 is not write locked and does not exceed a maximum number of pessimistic readers supported by a pessimistic read lock, STM library 14 causes an entry corresponding to the read access to be stored in read log 34R. If the read access is a pessimistic read access, STM library 14 also acquires a transactional lock 39A for the object 30. If the object 30 is locked for write access by another transaction 20, then STM library 14 detects a memory access conflict between the current transaction 20 and the other transaction 20 and may initiate the abort phase of transaction execution to rollback and re-execute the current transaction 20. If the object 30 is locked for write access by the current transaction 20, then STM library 14 may cause an entry corresponding to the read access to be stored in read log 34R or set a flag corresponding to the object 30 in write log 34W to indicate that the object 30 was also read. STM library 14 causes a read access 32 that occurs before a designated object 30 has been opened for writing by the transaction 20 to be made directly from the corresponding object 30. STM library 14 causes each read access 32 that occurs after a designated object 30 has been opened for writing by a transaction 20 to be made from either the corresponding object 30 directly or the corresponding shadow copy.

After a transaction 20 finishes executing or re-executing, STM library 14 performs validation and commit phases of transaction execution to ensure that the memory accesses by the transaction 20 did not conflict with the memory accesses by any other transaction 20. STM library 14 performs the validation phase by validating the read accesses of the transaction 20 to confirm that no other transaction 20 wrote a memory location corresponding to a read access of the transaction 20 subsequent to the read access being performed. If STM library 14 detects any memory access conflicts between the current transaction 20 and another transaction 20 during the validation phase, STM library 14 may initiate the rollback phase of transaction execution to rollback and re-execute the current transaction 20.

STM library 14 performs the commit phase by updating any objects 30 that were modified by the transaction 20 with the shadow copies used to store the modifications, releasing any transactional locks 39A, and/or storing an updated version number in the transactional locks 39A of any objects 30 that were modified by the transaction 20.

After successfully performing the validation and the commit phases of transaction execution, STM library 14 allows the transaction 20 to complete and allows the thread that caused the transaction 20 to be executed to execute additional transactional or non-transactional code in STM code 12.

STM system 10 allows the composition of traditional lock based synchronization with transactions 20 in STM code 12. Both transactions 20 and non-transactional code in STM code 12 may acquire and release traditional locks 39B to objects 30 in addition to the concurrency controls provided by STM library 14 for transactions 20 using transactional locks 39A. In particular, STM library 14 allows transactions 20 to contain the same traditional lock acquires and releases of traditional locks 39B that are included in non-transactional code in STM code 12.

To allow the composition of traditional locks 39B with transactions 20, STM library 14 physically acquires a traditional lock 39B for an object 30 the first time that a traditional lock acquire is encountered inside a transaction 20. By doing so, STM library 14 ensures that the traditional lock 39B cannot be acquired by another thread regardless of whether the other thread is executing transactional code or non-transactionsal code. When a traditional lock release is encountered inside a transaction 20 for a traditional lock 39B, however, STM library 14 continues executing the transaction 20 without releasing the traditional lock 39B and defers the traditional lock release until the commit phase of transaction execution. The traditional lock 39B remains locked until the traditional lock 39B is released during the commit phase of transaction execution.

STM library 14 maintains state information associated with traditional lock acquires and releases in transactions 20. The state information includes the number and type of operations on a traditional lock 39B encountered inside a transaction nest. By doing so, STM library 14 may elide traditional lock acquires for a traditional lock 39B of an object 30 on the second and subsequent lock acquires for the traditional lock 39B from a transaction 20. STM library 14 may also support unbalanced scenarios where a transaction 20 contains only a traditional lock acquire or only a traditional lock release. STM library 14 may further support complex scenarios where a transaction 20 contains multiple traditional lock acquires, multiple traditional lock releases, or an unequal number of traditional lock acquires and lock releases.

In one embodiment shown in FIG. 1, STM system 10 uses a lightweight key-based action framework to maintain state information associated with traditional lock acquires and releases in transactions 20. The framework includes a set of unified application programming interfaces (APIs) exposed by STM library 14 that allow clients (e.g., programmers and/or compilers) to implement actions 40 that can be registered, queried, and updated using specific keys 42 by transactions 20 or transaction nests in STM code 12. Each action 40 includes a key 42, state information 44, and a set of one or more callbacks 46 that can be hooked to the validation, commit, abort, and/or rollback phases of transaction execution. Actions 40 extend the built-in concurrency controls of STM system 10 with customized control logics, support transaction nesting semantics of STM system 10, and enable integration with embodiments of STM system 10 that operate with garbage collection systems. Additional details of a lightweight key-based action framework may be found in U.S. patent application Ser. No. 12/819,494, which is entitled "ACTION FRAMEWORK IN SOFTWARE TRANSACTIONAL MEMORY", filed concurrently herewith, and is incorporated by reference in its entirety. In other embodiments, STM system 10 uses other suitable programming constructs to maintain state information associated with traditional lock acquires and releases in transactions 20.

With the action framework, STM library 14 generates an action map 47 as indicated by an arrow 48 for each transaction 20 that registers an action 40. Each action map 47 includes references to the actions 40 registered by STM library 14 in response to action instructions 27 from the corresponding transaction 20. STM library 14 inserts each action 40 with an associated key 42 that is provided by a transaction 20 as a parameter with an action instruction 27 into a corresponding action map 47 for the transaction 20. State information 44 and callbacks 46 in each action 40 may be based on a type of the action instruction 27 and/or one or more parameters provided by the transaction 20 with the action instruction 27. Action instructions 27 may be added to transactions 20 by a programmer or a compiler such as compiler 92 shown in FIGS. 6 and 7.

STM library 14 manages actions 40 in each action map 47 using keys 42 instead of simply queuing actions 40 in a list. By doing so, STM library 14 allows a transaction 20 to query and update the corresponding actions 40 throughout the execution of the transaction 20. Accordingly, state information 44 and callbacks 46 may be modified by the transaction 20. The combination of keys 42, state information 44, and callbacks 46 contained by actions 40 may overcome the limitations of a stateless callback infrastructure that prevent certain STM programming scenarios from being solved. In addition, the use of a single action 40 for each key 42 may allow a transaction 20 to execute with increased efficiency by avoiding adding multiple callback invocations for the same purpose.

In addition to associating per-instances state with transactions 20, STM library 14 may also generate keys 42 that combine instance identifier information with facility identifier information. By doing so, STM library 14 allows registration of multiple actions 40 with the same facility or across different facilities and provides for disambiguation between actions 40 that use object addresses as keys 42 for different purposes (e.g., shadow copy management and traditional lock management). In addition, STM library 14 prevents one facility from accessing the state (i.e., the action 40) maintained by a different facility. As a result, the action framework of STM library 14 may be exposed to users in a secure manner.

The action framework APIs of STM library 14 provide three types of callbacks that allow transactions 20 to hook into STM system 10. The callbacks include transaction stage callbacks, nesting integration callbacks, and resource management and garbage collection integration callbacks. Each action 40 provides a customized implementation of these callbacks if specific behaviors are desired.

In one embodiment, the transaction stage callbacks include OnPrepareForCommit, OnCommit, and OnRollback. The OnPrepareForCommit callback occurs during the validation phase of a transaction 20. During the validation phase, STM library 14 detects any actions 40 that implement the OnPrepareForCommit callback 46 and invokes any such callbacks 46. The OnPrepareForCommit callback 46 allows a transaction 20 to participate in the validation process that determines whether a transaction 20 commits or rolls back and re-executes. The OnCommit callback 46 occurs during the commit phase. During the commit phase, STM library 14 detects any actions 40 that implement the OnCommit callback 46 and invokes any such callbacks 46. The OnRollback callback 46 occurs during the rollback phase when a transaction 20 aborts or rolls back for re-execution. When a transaction 20 reaches an abort or roll back point, STM library 14 detects any actions 40 that implement the OnRollback callback 46 and invokes any such callbacks 46. In other embodiments, the transaction stage callbacks may include other callbacks 46 related to different phases of execution of transactions 20.

The action framework of STM library 14 includes built-in support of nesting semantics of actions 40. Transactions 20 may provide a SearchParent parameter with an action instruction 27 to specify whether the current action 40 is to be associated with the innermost nested transaction 20 that is currently active or with the whole transaction nest. The close integration with the transaction nesting hierarchy may provide greater flexibility and expressiveness to transactions 20 that implement actions 40. Accordingly, transactions 20 may choose either flat or nesting semantics for their actions 40.

In one embodiment, the nesting integration callbacks include DeferToParentOnCommit, DeferToParentOnAbort, MergeToParent, and SurviveOnRollback callbacks 46. The DeferToParentOnCommit and DeferToParentOnAbort callbacks 46 allow nested transactions 20 to specify whether an action 40 is to be deferred to a parent transaction 20 when committing (DeferToParentOnCommit) or aborting (DeferToParentOnAbort) the nested transactions 20. For actions 40 that are deferred to a parent transaction 20, STM library 14 inserts or updates a corresponding action 40 in the action map 47 of the parent transaction 20. The MergeToParent callback allows a nested transaction 20 to specify how to merge the state of an action 40 into an action 40 with the same key 42, if any, in the action map 47 of the parent transaction 20. The SurviveOnRollback 46 causes an action 40 to be maintained, rather than deleted, in action map 47 when a transaction 20 rolls back. In other embodiments, the nesting integration callbacks may include other callbacks 46 related to nested transactions 20.

For embodiments of STM system 10 that work with languages powered by garbage collection, such as C# or Java, garbage collection integration with STM library 14 ensures correctness. If STM system 10 holds a reference to a memory location that is managed by the garbage collector, STM system 10 reports the reference to the garbage collector so that the reference can be updated correctly during garbage collections. Because actions 40 may hold managed references, STM library 14 provides garbage collection hooks to let actions 40 report any references to the garbage collector.

In one embodiment, the resource management and garbage collection integration callbacks include Release and OnGCScan callbacks 46. The Release callback 46 occurs during the commit phase where STM library 14 to allow a transaction 20 to release a resource. The OnGCScan callback 46 occurs during garbage collection to allow STM library 14 to report references in actions 40 to the garbage collector. In other embodiments, the resource management and garbage collection integration callbacks may include other callbacks 46 related to resource management and garbage collection.

Figure 2A:
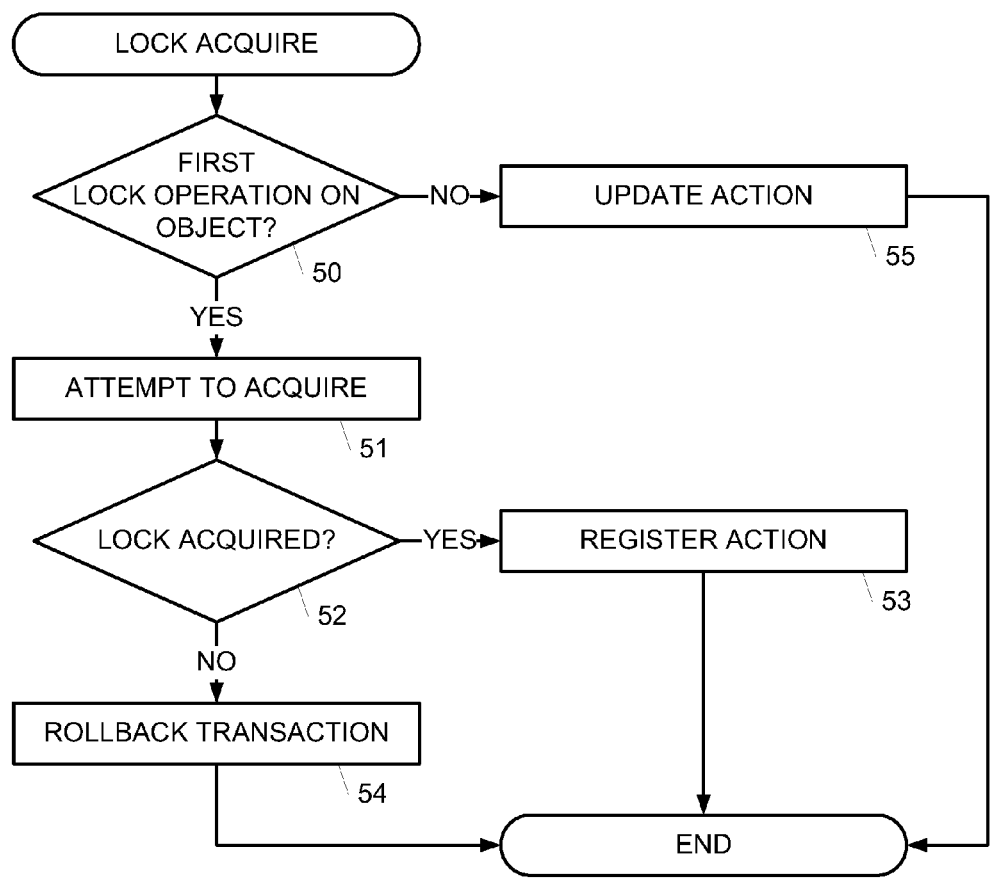
FIGS. 2A-2B are flow charts illustrating an embodiment of a method for processing traditional lock operations in a software transactional memory system.
Figure 2B:
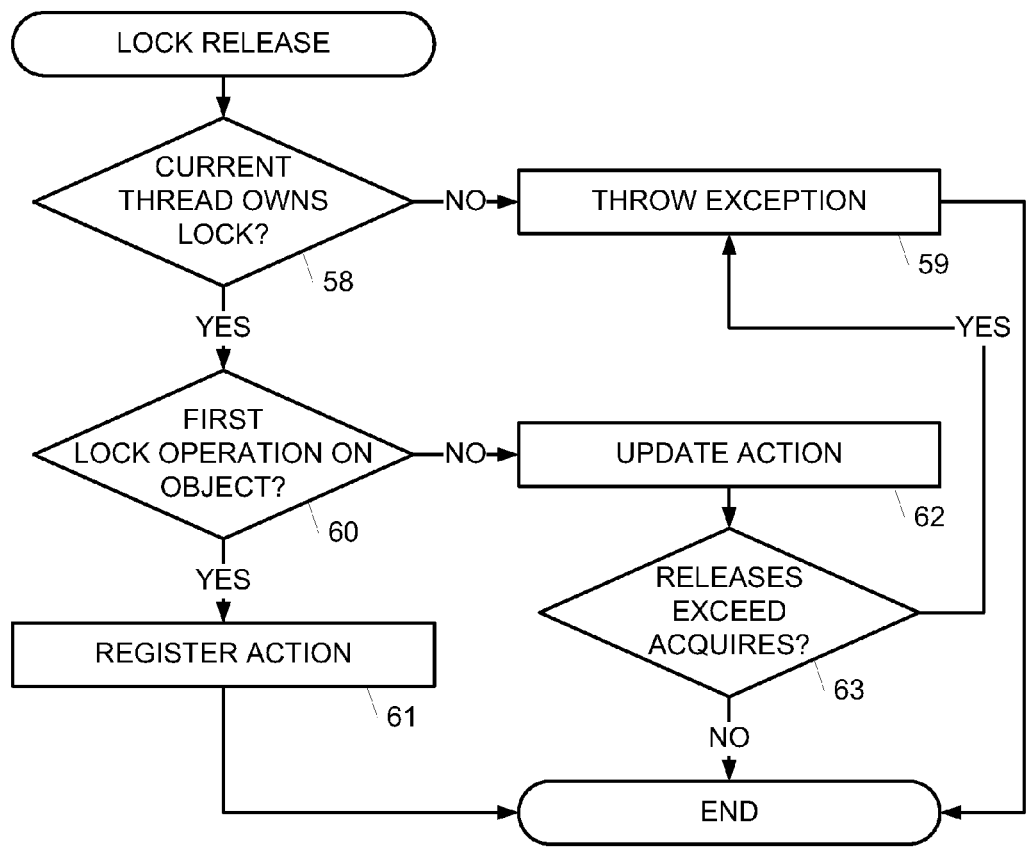

STM library 14 generally registers an action 40 for the first traditional lock acquire or lock release of a lock 39 of each object 30 for each transaction 20 unless an exception or contention on the traditional lock 39B occurs. FIGS. 2A-2B are flow charts illustrating an embodiment of a method for processing traditional lock operations in STM system 10.

FIG. 2A illustrates an embodiment of a method for processing the acquisition of a traditional lock 39B of an object 30 in a transaction 20. To initiate the acquisition of a traditional lock 39B, a transaction 20 invokes an action instruction 27 in STM library 14 with parameters that include a reference to the object 30 and an indication that the instruction 27 is for an acquisition of a lock 39. In response to the action instruction 27, STM library 14 determines whether the traditional lock acquire operation is the first traditional lock operation (i.e., the first traditional lock acquire operation or the first traditional lock release operation) on the object 30 from the transaction 20 as indicated in a block 50. If so, STM library 14 attempts to acquire the traditional lock 39B as indicated in a block 51. If the lock 39B is successfully acquired, then STM library 14 registers a lock interoperation action 40 for the object 30 in the action map 47 of the transaction if the lock 39B is acquired as indicated in blocks 52 and 53. STM library 14 may use the reference to the object as the key 42 and indicate the lock 39B has been acquired for the first time in state information 44. STM library 14 may also initialize other information in state information 44 that includes the number of times that the current thread recursively acquired the lock 39B before the transaction 20 began, the number of times that the object 30 was locked inside the current transaction 20 and all nested transactions 20 that have committed, the number and type of lock operations that were deferred inside the transaction 20, and the number of times that the object 30 was physically locked in nested transactions 20 that were aborted. STM library 14 also registers a callback 46 corresponding to a rollback phase of transaction execution for the transaction 20 to cause the lock 39B to be released during rollback processing of the transaction 20.

If the lock 39B is not successfully acquired as indicated in block 52, then STM library 14 may cause the transaction 20 to rollback based on a conflict on the object 30 between the transaction 20 and another transaction 20 or other non-transactional code in STM code 12 as indicated in a block 54.

If the traditional lock acquire operation is not the first traditional lock operation on the object 30 from the transaction 20 as indicated in block 50, then STM library 14 updates the state information 44 in the lock interoperation action 40 for the object 30 as indicated in a block 55. In particular, STM library 14 increments the number of times the object 30 was locked inside the current transaction 20 and all nested transactions 20 that have committed to reflect the present traditional lock acquire operation.

FIG. 2B illustrates an embodiment of a method for processing the release of a traditional lock 39B of an object 30 in a transaction 20. To initiate the release of a lock 39B, a transaction 20 invokes an action instruction 27 in STM library 14 with parameters that include a reference to the object 30 and an indication that the instruction 27 is for a release of a lock 39B. In response to the action instruction 27, STM library 14 determines whether the current thread owns the lock 39B as indicated in a block 58. If not, STM library 14 throws an exception as indicated in a block 59.

If the current thread owns the lock 39B, STM library 14 determines whether the lock acquire operation is the first traditional lock operation on the object 30 from the transaction 20 as indicated in a block 60. If so, then STM library 14 registers a lock interoperation action 40 for the object 30 in the action map 47 of the transaction if the lock 39B is owned by the current thread as indicted in a block 61. STM library 14 may use the reference to the object as the key 42, indicate the lock 39B has been released for the first time in state information 44, and register a callback 46 corresponding to a commit phase of transaction execution for the transaction 20 to cause the lock release to occur during commit processing of the transaction. STM library 14 may also initialize the other information in state information 44 described above with reference to FIG. 2A.

If the lock acquire operation is not the first traditional lock operation on the object 30 from the transaction 20 as indicated in block 60, then STM library 14 updates the state information 44 in the lock interoperation action 40 for the object 30 as indicated in a block 62. In particular, STM library 14 decrements the number of times the object 30 was locked inside the current transaction 20 and all nested transactions 20 that have committed to reflect the present lock release operation. STM library 14 determines whether the number of traditional lock releases for the lock 39B exceed the number of traditional the lock acquires for the lock 39B as indicated in a block 63. To do so, STM library 14 examines state information 44 which identifies the number of times that the current thread recursively acquired the lock 39B before the current transaction 20 began, the number of times that the object 30 was locked inside the current transaction 20 and all nested transactions 20 that have committed, the number and type of lock operations that were deferred inside the transaction 20, and the number of times that the object 30 was physically locked in nested transactions 20 that were aborted. If the lock releases exceed the lock acquires for the lock 39B, then STM library 14 throws an exception as indicated in block 59.

STM library 14 performs the methods of FIGS. 2A and 2B to cause a transaction 20 to hold each lock 39B taken by the transaction 20 until the whole transaction nest that includes the transaction 20 commits successfully or aborts. The use of the lock interoperation action 40 causes release of the locks 39B to be deferred until the whole transaction nest commits successfully or aborts even if there are lock release operations inside the transaction 20 or transaction nest. The lock interoperation action 40 also allows a single physical lock operation to be performed for each lock 39B in a transactional nest.

STM system 14 accesses the action map 47 for a transaction 20 at each phase of transaction execution of the transaction 20 to identify actions 40 with callbacks 46 associated with the transaction execution phases. In response to reaching a transaction execution phase for a transaction 20, STM library 14 identifies each action 40 in the action map 47 of the transaction 20 with callbacks 46 associated with the transaction execution phase and invokes the identified callbacks 46 for the transaction execution phase, if any, for each action 40 in the action map 47.

STM library 14 uses lock interoperation actions 40 to allow traditional lock operations to be compensated when a transaction 20 rolls back or a transaction nest (i.e., the top level transaction 20 of a transaction nest) commits. If a transaction 20 rolls back, STM library 14 accesses actions 40 to identify locks 39B that were acquired by the transaction 20 and invokes the callbacks 46 to release the locks 39B. STM library 14 leaves any locks 39B that were released by the rolled back transaction 20 unchanged.

When a nested transaction 20 commits (i.e., a transaction 20 in a transaction nest other than the top level transaction 20 of the transaction nest), STM library 14 merges the actions 40 associated with locks 39B in the action map 47 of the nested transaction 20 into corresponding actions 40 in the action map 47 of the parent transaction 20. STM library 14 merges the actions 40 by registering any actions 40 from the nested transaction 20 that are not present in the action map 47 of the parent transaction 20 and updating any actions 40 from the nested transaction 20 that are present in the action map 47 of the parent transaction 20 (i.e., actions 40 with the same keys 42 in the parent and nested action maps 47). By doing so, STM library 14 updates the state of the actions of the parent transaction 20 to reflect the lock operations performed by the nested transaction 20 and defers any lock releases from the nested transaction 20 until the top level transaction 20 commits.

By merging actions 40 from nested transactions 20 as described above, the actions 40 in the action map 47 of a top level transaction 20 include information about the traditional lock operations that occurred in the transaction nest. These actions 40 were also initialized to include information regarding relevant traditional lock operations that preceded the top level transaction 20 as noted above. Accordingly, STM library 14 may optimize the performance of STM system 10 by omitting redundant lock operations.

When a top level transaction 20 of a transaction nest commits, STM library 14 executes the minimum number of deferred operations to correctly set the state of each lock 39B operated on by the transaction nest. For example, if a transaction nest acquires a lock 39B three times, STM library 14 acquires the lock 39B one time and defers the other two lock acquires. If the transaction nest subsequently releases the lock 39B three times, STM library 14 defers these releases and, at commit time, determines that two lock acquires have been deferred and three lock releases have been deferred. Accordingly, STM library 14 performs one lock release to correctly set the state of the lock 39B without performing the additional lock acquires or lock releases.

In one embodiment, STM system 10 operates in a computer system with the .NET framework from Microsoft. The .NET framework allows programmers to use lexically scoped locks using the lock keyword and to specify acquire and releases individually via static methods on the Monitor class. Lock acquires can be done through the Monitor.Enter, Monitor.TryEnter, and Monitor.ReliableEnter methods, and lock releases can be done through the Monitor.Exit methods. These methods can lead to unbalanced scenarios where a transaction 20 contains only a traditional lock acquire or a traditional lock release. These methods can also lead to more complex scenarios where a transaction contains multiple traditional lock acquires, multiple traditional lock releases, or an unequal number of traditional lock acquires and releases. STM system 10 supports these unbalanced and complex scenarios by maintaining the state information actions 40 about the number and type of operations on a lock encountered inside a transaction nest as described above.

Figure 3:
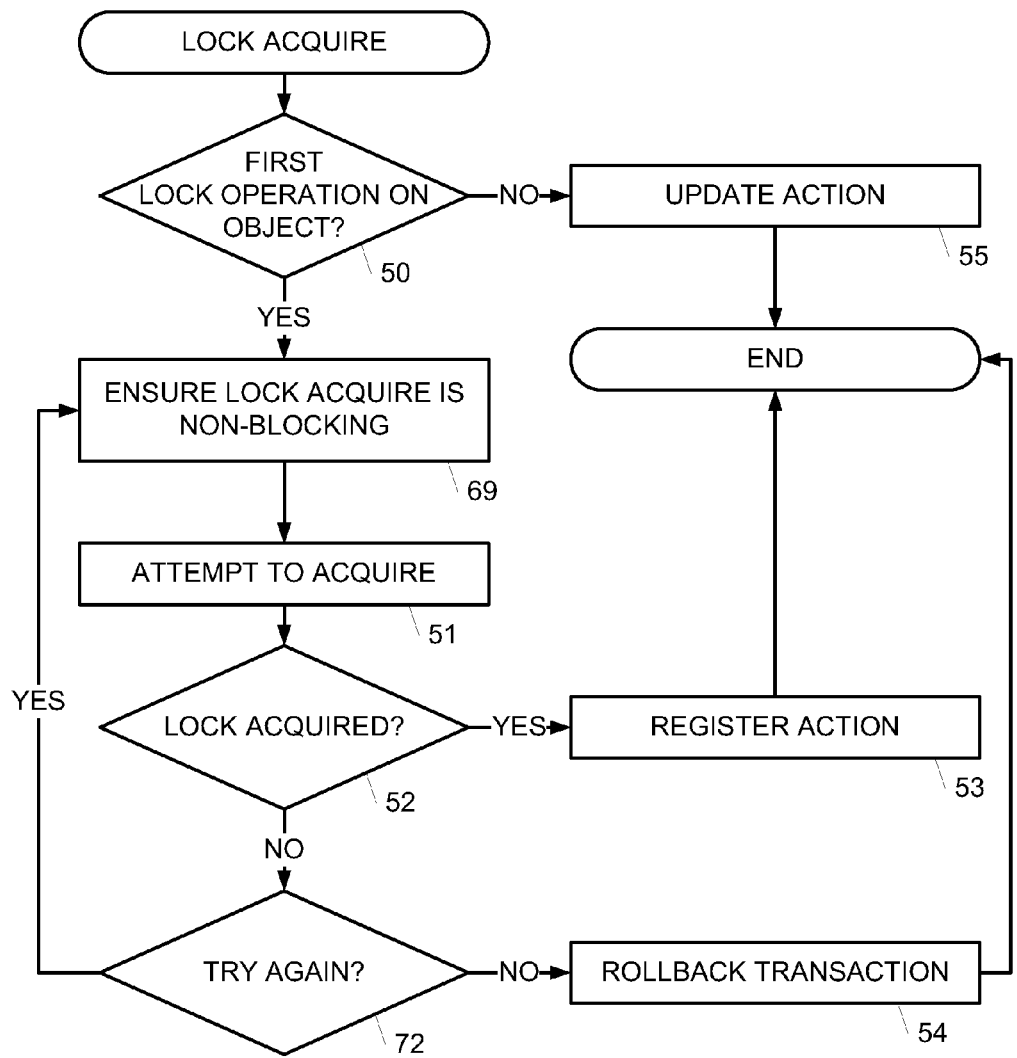
FIG. 3 is a flow chart illustrating an embodiment of a method for processing traditional lock operations with contention management in a software transactional memory system.

With the above embodiments, STM library 14 may also implement additional contention management algorithms to increase the performance of STM system 10. In particular, calls to acquire a lock inside a transaction 20 that may block the thread until the lock is acquired may be set to ensure that the thread does not block. For example, the Monitor.TryEnter method of the .NET framework may be set with a zero timeout. In addition, STM library 14 may retry any lock acquires that do not succeed using various contention management techniques. FIG. 3 is a flow chart illustrating an embodiment of a method for processing lock operations with contention management algorithms in STM system 19.

To initiate the acquisition of a traditional lock 39B in the embodiment of FIG. 3, a transaction 20 invokes an action instruction 27 in STM library 14 with parameters that include a reference to the object 30 and an indication that the instruction 27 is for an acquisition of a lock 39B. In response to the action instruction 27, STM library 14 determines whether the lock acquire operation is the first traditional lock operation on the object 30 from the transaction 20 as indicated in block 50 and described above with reference to FIG. 2A. If so, STM library 14 ensures that the lock acquire is non-blocking as indicated in a block 69. In embodiments with the .NET framework, for example, STM library 14 may set the timeout of a Monitor.TryEnter method to zero.

If the lock acquire operation is the first traditional lock operation on the object 30 from the transaction 20, STM library 14 attempts to acquire the lock 39B as indicated in block 51. If the lock 39B is successfully acquired as indicated in block 52 and described above with reference to FIG. 2A, then STM library 14 registers a lock interoperation action 40 for the object 30 in the action map 47 of the transaction if the lock 39B is acquired as indicted in block 53 and described above with reference to FIG. 2A.

If the lock 39B is not successfully acquired as indicated in block 52, then STM library 14 invokes a contention management algorithm to determine whether to reattempt to acquire the lock 39B as indicated in a block 72. In one embodiment, the contention management algorithm reattempts the lock acquisition a designated number of times (i.e., performs the functions of blocks 69, 51, and 52) before rolling back the transaction 20 if the reattempts are unsuccessful. In another embodiment, the contention management algorithm reattempts the lock acquisition a designated number of times but introduces backoff delays with each subsequent reattempt before rolling back the transaction 20 if the reattempts are unsuccessful. The backoff delays may be constant or grow linearly or exponentially with each successive reattempt.

By deferring traditional lock releases until transactions 20 commit, lock ordering deadlock problems may occur where multiple transactions 20 contend for the same set of traditional locks 39B. Accordingly, STM library 14 may also provide deadlock detection and avoidance techniques in the contention management algorithm. For example, the contention management algorithm may keep track of all of the locks 39B that the transaction 20 acquires or attempts to acquire. If the conflicting transactions 20 are re-executed, STM library 14 may try to acquire all of the locks 39B of the conflicting transactions 20 immediately and also introduce some artificial order in trying to acquire the locks 39B. By introducing an artificial order, STM library 14 may help prevent deadlocks if multiple transactions 20 are trying to access the same set of locks 39B. In addition, the contention management algorithm may define a universal way of generating the lock acquisition order, such as ordering lock acquisitions based on the object hashcode. By doing so, STM library 14 may ensure that a transaction 20 that acquired locks 39B when the transaction 20 was re-executed would not deadlock.

If the contention management algorithm decides not to reattempt to acquire the lock 39B in block 72, then STM library 14 causes the transaction 20 to rollback as indicated in block 54 and described above with reference to FIG. 2A.

If the lock acquire operation is not the first lock operation on the object 30 from the transaction 20 as indicated in block 50, then STM library 14 updates the state information 44 in the lock interoperation action 40 for the object 30 as indicated in block 55 and described above with reference to FIG. 2A.

STM library 14 may be further configured to elide traditional lock acquisitions that occur only in transactions 20 using the action framework. When a thread acquires a lock 39B outside a transaction 20, other threads are prevented from acquiring that lock 39B either inside or outside a transaction. When all operations on shared objects 30 are made within transactions 20, however, STM library 14 may ignore the presence of traditional locks 39B because STM library 14 inherently provides isolation between transactions 20 using transactional locks 39A. Accordingly, STM library 14 tracks of whether a traditional lock 39B has been acquired outside a transaction 20 or only inside transactions 20 to allow lock acquisitions in transactions 20 to be elided.

Figure 4:
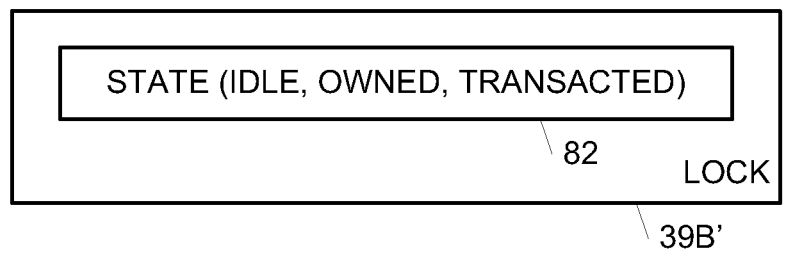
FIG. 4 is a block diagram illustrating an embodiment of a traditional lock with a state indicator.

In one embodiment where STM library 14 is configured to elide lock acquisitions, objects 30 have embodiments 39B' of locks 39B as shown in FIG. 4. Rather than indicating only locked or unlocked states, locks 39B' include a state indicator 82 that indicates whether a corresponding object 30 is idle (i.e., not in use by any thread), owned (i.e., exclusively acquired by one thread), or transacted (i.e., shared by one or more threads inside transactions 20).

When an idle lock 39B' is acquired by non-transactional code, the state 82 of the lock 39B' is changed to owned. A thread cannot acquire a lock 39B' owned by another thread with either transactional or non-transactional code. The state 82 reverts to idle when that thread releases the lock 39B'. When an idle lock is acquired inside a transaction 20, STM library 14 changes state 82 to transacted. When a lock 39B' is transacted (i.e., acquired or released in a transaction 20), other threads can acquire the lock inside of a transaction 20 but not outside of a transaction 20 (i.e., with non-transactional code). When all transactions 20 that acquired and released that lock 39B' are committed or aborted, STM library 14 changes the state 82 back to idle.

Using the embodiment of FIG. 4, STM library 14 sets the state 82 of each lock 39B' of objects 30 that are locked or released by a transaction 20 to transacted if the state 82 is idle. STM library 14 does so when registering an action 40 for a lock operation by a transaction 20. For lock acquisitions, STM library 14 elides the actual lock acquisition and relies on the state 82 to ensure that conflicts are detected. If the state 82 of a lock 39B' is owned, STM library 14 either rolls back the transaction 20 or invokes a contention management algorithm as described above.

Figure 5:
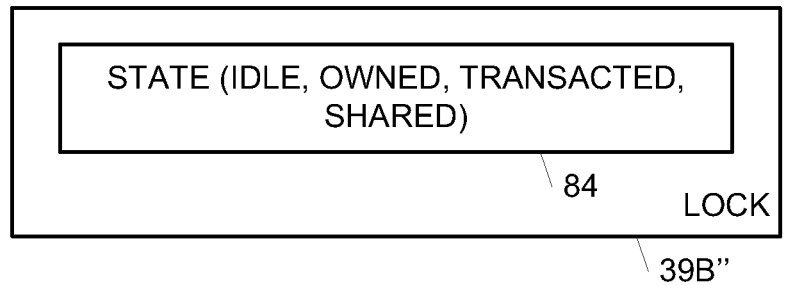
FIG. 5 is a block diagram illustrating another embodiment of a traditional lock with a state indicator.

In addition to eliding lock acquisitions as just described, STM library 14 may be further configured to access reader/writer locks in transactions using the action framework and the embodiment 39B" of locks 39B shown in FIG. 5. As shown in FIG. 5, locks 39B" include a state indicator 84 that extends the idle, owned, or transacted states as described above with reference to state indictor 82 in FIG. 4 to include shared (i.e., shared by one or more threads inside or outside transactions 20). When state 84 of a lock 39B" is shared (rather than (exclusively) owned), multiple threads may concurrently acquire the lock 39B" either transactionally or non-transactionally.

In the above embodiments, STM system 10 preserves traditional lock acquire and lock release semantics, including exception behavior and unbalanced scenarios, when traditional lock operations are accessed inside transactions 20. STM system 10 also maintains the semantics for nested transactions and for systems that implement garbage collection. In addition, STM system 10 may reduce the actual number of traditional lock operations that are performed by omitting redundant lock operations when a transaction 20 commits or aborts. Further, STM system 10 may implement contention management algorithms that may increase the performance of system 10.

STM library 14 may also use the action framework described above to solve one or more STM programming scenarios such as supporting the use of thread local memory in transactions 20, supporting static class initializers and modular initializers in transactions 20, and providing a customized abstract concurrency control in other embodiments.

Figure 6:
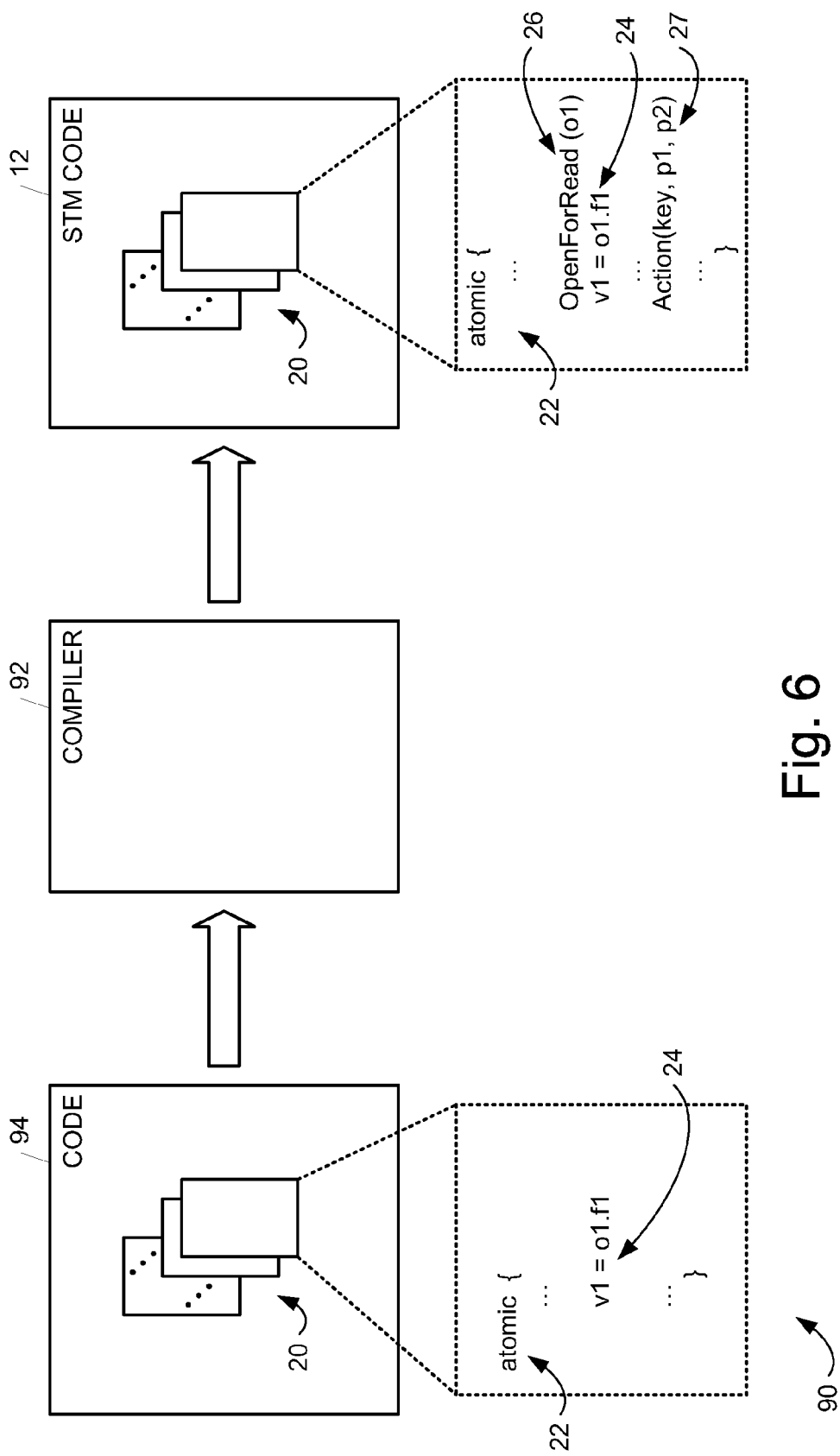
FIG. 6 is a block diagram illustrating an embodiment of a compiler system with a compiler that is configured to compile source code with software transactional memory transactions.

FIG. 6 is a block diagram illustrating an embodiment of a compiler system 90 with a compiler 92 that is configured to compile source code 94 with STM transactions 20.

Compiler system 90 represents a compile mode of operation in a computer system, such as computer system 100 shown in FIG. 7 and described in additional detail below, where the computer system is executing instructions to compile code 94 into STM code 12. In one embodiment, compiler system 90 includes a just-in-time (JIT) compiler system 92 that operates in the computer system in conjunction with a runtime environment executed by an operating system (OS), such as OS 122 shown in FIG. 7 and described in additional detail below, STM library 14, and any additional runtime libraries (not shown). In another embodiment, compiler system 90 includes a stand-alone compiler system that produces STM code 12 for execution on the same or a different computer system.

Code 94 includes a set of one or more STM transactions 20. Each STM transaction 20 includes an atomic block designator 22 that indicates to compiler 92 that a corresponding portion of code 94 is an STM transaction 20. Each STM transaction 20 may include zero or more memory accesses 24 that read from and/or write to an object 30. Each STM transaction 20 may also include zero or more action instructions 27 (not shown) that generate, query, or update actions 40. Code 94 may be any suitable source code written in a language such as Java or C# or any suitable bytecode such as Common Intermediate Language (CIL), Microsoft Intermediate Language (MSIL), or Java bytecode.

Compiler 92 accesses or otherwise receives code 94 with transactions 20 that include memory accesses 24. Compiler 92 identifies memory accesses 24 and compiles code 94 into STM code 12 with invocations 26 of STM primitives in STM library 14 for each memory access 24. Compiler 92 may also identify instances where an action 40 may be used and compiles code 94 into STM code 12 with action instructions 27 for each instance where an action 40 may be used. Compiler 92 performs any desired conversion of the set of instructions of code 94 into a set of instructions that are executable by a designated computer system and includes the set of instructions in STM code 12.

Figure 7:
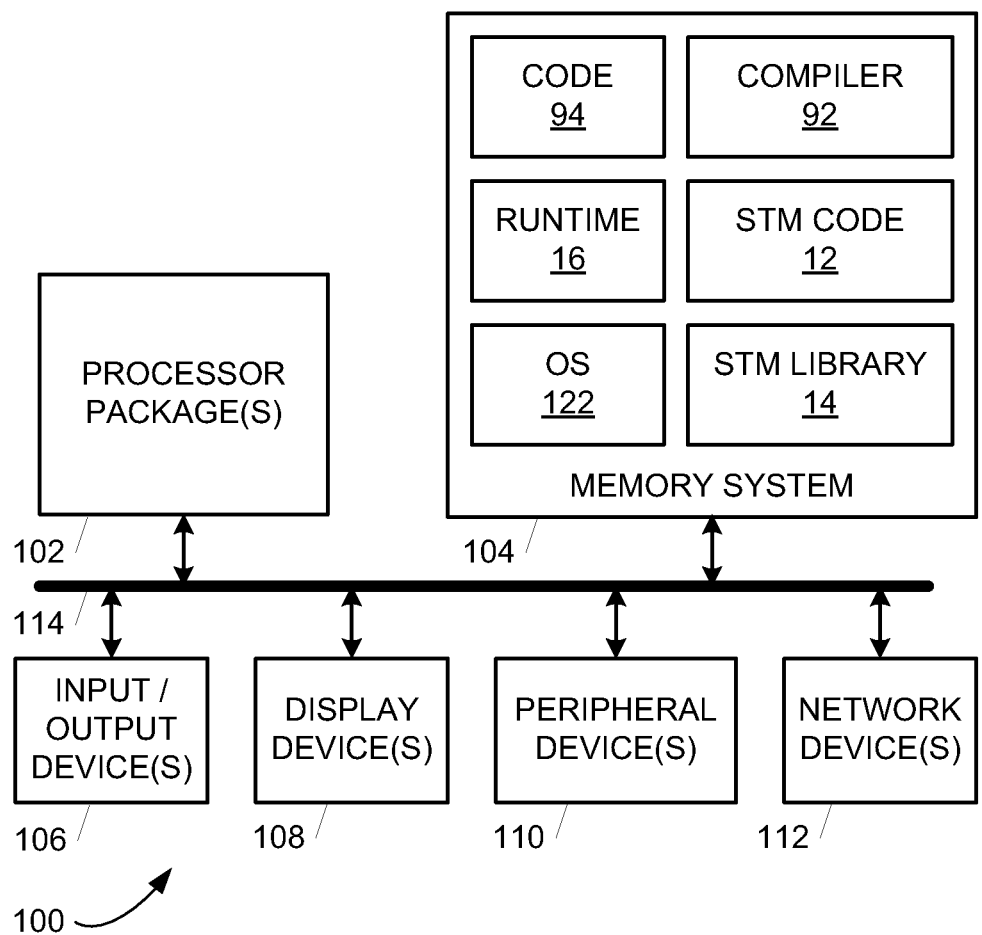
FIG. 7 is a block diagram illustrating an embodiment of a computer system configured to implement a software transactional memory system.

FIG. 7 is a block diagram illustrating an embodiment of a computer system 100 configured to implement STM system 10.

Computer system 100 includes one or more processor packages 102, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 104. The instructions may include a basic input output system (BIOS) or firmware (not shown), OS 122, STM code 12, STM library 14, runtime environment 16, compiler 92, and code 94. Each execution core may execute the instructions in conjunction with or in response to information received from input/output devices 106, display devices 108, peripheral devices 110, and/or network devices 112.

Computer system 100 boots and executes OS 122. OS 122 includes instructions executable by execution cores to manage the components of computer system 100 and provide a set of functions that allow programs to access and use the components. OS 122 executes runtime environment 16 to allow STM code 12 and STM library to be executed. In one embodiment, OS 122 is the Windows operating system. In other embodiments, OS 122 is another operating system suitable for use with computer system 100.

Computer system 100 executes compiler 92 to generate STM code 12 from code 94. Compiler 92 accesses or otherwise receives code 94 and transforms code 94 into STM code 12 for execution by computer system 100. Compiler 92 performs any desired conversion of the set of instructions of code 94 into a set of instructions that are executable by computer system 100 and includes the set of instructions in STM code 12. Compiler 92 also identifies blocks 20 in code 94 from transaction designators 22 and modifies blocks 20 in STM code 12 to include invocations of STM primitives 26.

In one embodiment, compiler 92 includes a just-in-time (JIT) compiler that operates in computer system 100 in conjunction with OS 122, runtime environment 16, and STM library 14. In another embodiment, compiler 92 includes a stand-alone compiler that produces STM code 12 for execution on computer system 100 or another computer system (not shown).

Computer system 100 executes runtime environment 16 and STM library 14 to allow STM code 12, and transactions 20 therein, to be executed in computer system 100 as described above.

Memory system 104 includes any suitable type, number, and configuration of volatile or non-volatile storage devices configured to store instructions and data. The storage devices of memory system 104 represent computer readable storage media that store computer-executable instructions including STM code 12, STM library 14, runtime environment 16, OS 122, compiler 92, and code 94. The instructions are executable by computer system 100 to perform the functions and methods of STM code 12, STM library 14, runtime environment 16, OS 122, compiler 92, and code 94 as described herein. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a software transactional memory (STM) system in a computer system, the method comprising:
    detecting a lock release operation corresponding to a traditional lock of an object from a first transaction executed by the STM system; and
    deferring the lock release operation until the first transaction commits.

2. The method of claim 1 further comprising:
    throwing an exception in response to determining that a thread executing the first transaction does not own the traditional lock.

3. The method of claim 1 further comprising:
    detecting a lock acquire operation corresponding to the traditional lock prior to detecting the lock release operation; and
    attempting an acquisition of the traditional lock in response to the lock acquire operation being a first lock operation on the object from the first transaction.

4. The method of claim 3 further comprising:
    updating information corresponding to the traditional lock without acquiring the traditional lock in response to the lock acquire operation being other than the first lock operation on the object from the first transaction.

5. The method of claim 1 further comprising:
    registering an action corresponding to the lock release operation with a key corresponding to the object and a callback corresponding to a commit phase of transaction execution in response to the lock release operation being the first release lock operation on the object from the first transaction.

6. The method of claim 1 further comprising:
    updating an action corresponding to the lock release operation with a key corresponding to the object and a callback corresponding to a commit phase of transaction execution in response to the lock release operation being other than the first lock release operation on the object from the first transaction.

7. The method of claim 1 further comprising:
    registering an action corresponding to a lock acquire operation with a key corresponding to the object and a callback corresponding to a rollback phase of transaction execution in response to the lock acquire operation being the first acquire lock operation on the object from the first transaction.

8. The method of claim 1 further comprising:
    merging a first action corresponding to the lock release operation into an action map corresponding to a second transaction in response to the first transaction committing, the second transaction being a parent transaction of the first transaction.

9. A method performed by a software transactional memory (STM) system in a computer system, the method comprising:
    acquiring a transactional lock for a first object;
    detecting a traditional lock acquire operation corresponding to a traditional lock of a second object from a transaction executed by the STM system; and
    attempting an acquisition of the traditional lock in response to the traditional lock acquire operation being a first traditional lock operation on the second object from the transaction.

10. The method of claim 9 further comprising:
    updating information corresponding to the traditional lock without acquiring the traditional lock in response to the traditional lock acquire operation being other than the first traditional lock operation on the second object from the first transaction.

11. The method of claim 10 further comprising:
    invoking a contention management algorithm to determine whether to retry the acquisition of the traditional lock or rollback the transaction in response to the traditional lock not being acquired successfully.

12. The method of claim 9 further comprising:
    registering an action corresponding to the traditional lock acquire operation with a key corresponding to the second object and a callback corresponding to a rollback phase of transaction execution in response to the traditional lock acquire operation being the first traditional lock operation on the second object from the first transaction.

13. The method of claim 12 further comprising:
    updating the action in response to the traditional lock acquire operation being other than the first traditional lock operation on the second object from the first transaction.

14. The method of claim 9 further comprising:
    eliding the traditional lock acquire operation in response to determining that the second object is not exclusively acquired by a thread.

15. The method of claim 9 wherein the traditional lock forms a reader/writer lock, and further comprising:

accessing the reader/writer lock in response to determining that the second object is shared by one or more threads each executing transactional or non-transactional code.

16. A computer readable storage medium storing computer-executable instructions that, when executed by a computer system, perform a method comprising:

detecting a lock acquire operation corresponding to a traditional lock of an object from a first transaction executed by a software transactional memory (STM) system;

attempting an acquisition of the traditional lock in response to the lock acquire operation being a first lock operation on the object from the first transaction;

updating information corresponding to the traditional lock without acquiring the lock in response to the lock acquire operation being other than the first lock operation on the object from the first transaction;

detecting a lock release operation corresponding to the traditional lock from the first transaction executed by the STM system; and deferring the lock release operation until the first transaction commits.

17. The computer readable storage medium of claim 16, the method further comprising:

in response to the lock release operation, throwing an exception in response to a first number of lock release operation from a thread executing the first transaction exceeding a second number of lock acquire operations from the thread.

18. The computer readable storage medium of claim 17, the method further comprising:

registering an action with a key corresponding to the object and a callback corresponding to a phase of transaction execution in response to one of the lock acquire operation and the lock acquire operation; and updating the action in response to the other of the lock acquire operation and the lock acquire operation.

19. The computer readable storage medium of claim 18, the method further comprising:

merging the action into an action map corresponding to a second transaction in response to the first transaction committing, the second transaction being a parent transaction of the first transaction.

20. The computer readable storage medium of claim 19, the method further comprising:

in response to a top level transaction in a transaction nest that includes the first transaction committing, executing a minimum number of deferred lock operations to correctly set a state of the traditional lock.

\* \* \* \* \*